Jan. 6, 1959          M. S. SABOE          2,867,085
AFTERBURNER DESIGN, VAPORIZING TYPE
Filed March 3, 1955
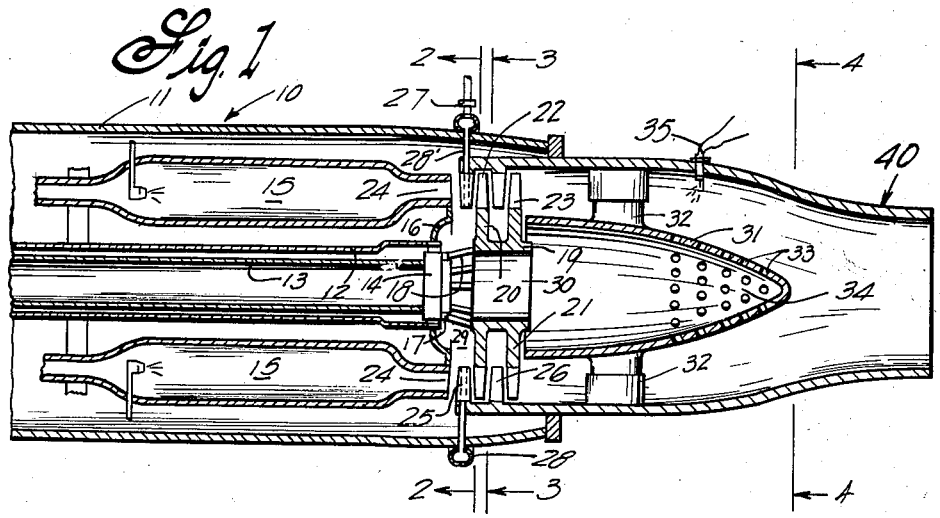
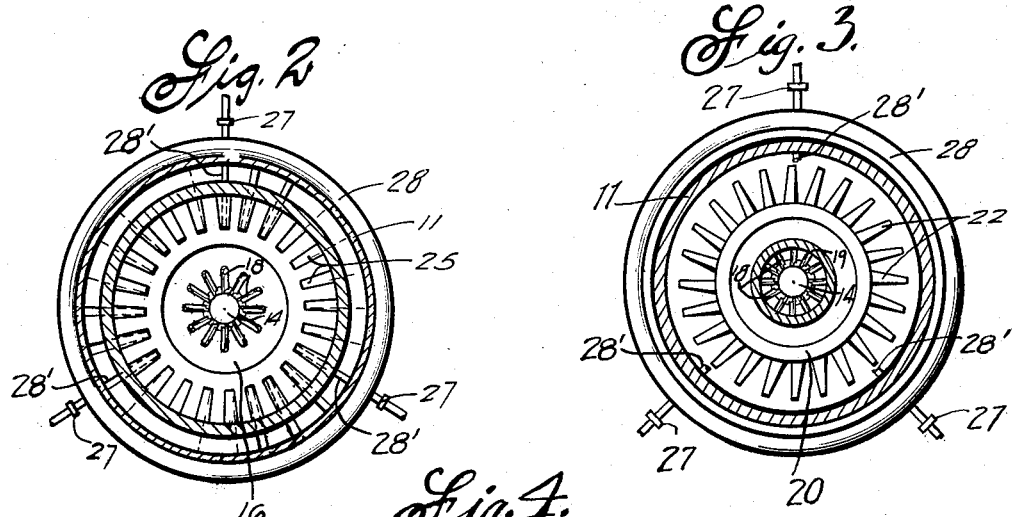
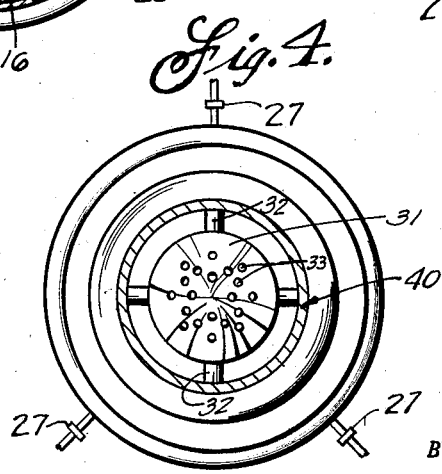
INVENTOR.
MICHEAL S. SABOE
BY
ATTORNEY

United States Patent Office 2,867,085
Patented Jan. 6, 1959

2,867,085

AFTERBURNER DESIGN, VAPORIZING TYPE

Michael S. Saboe, Trumbull, Conn., assignor, by mesne assignments, to the United States of America as represented by the Secretary of the Navy Application March 3, 1955, Serial No. 492,054

3 Claims. (Cl. 60—39.71)

This invention relates to the art of reactive internal combustion engines and to means provided for augmenting the output and overall efficiency of such engines.

It is well known in the art of turbo jet engines to provide a secondary combustion or afterburning zone downstream of primary engine combustors for thrust augmentation as required by the operational demands of an aircraft propelled by such an engine. In this zone, additional fuel is introduced or injected into the hot gases leaving the last turbine stage to support secondary burning therein with resultant increase in the heat energy of the discharged gases.

In those turbo jet engines utilizing thrust augmenters in the form of afterburners, it has been the practice to provide a flameholder. The flameholder, usually a grid or network formed of a metallic material, is installed just forward of the afterburner and by creating a region of high turbulence and eddy currents, it retards the velocity of the hot gases in the afterburner so that combustion is complete before the gas passes through the engine exhaust nozzle. The flameholder also serves to prevent the burning gases in the afterburner from flowing forward to the region of the turbine. As the flameholder is itself subjected to extremely high temperatures, its life is comparatively short and when the afterburner is not in use either it offers an obstacle to the flow of gas from the turbine to the exhaust nozzle or means is provided to rotate it to a position where it presents the least frontal area. A means provided in the afterburner or just forward to achieve the same result would afford a weight reduction and the elimination of a part which must be continually replaced.

Further, it is well known in the art that the operating temperatures of various portions of the engine are limited by the inability of materials otherwise suitable for use in such engines to withstand temperatures above certain values. Since the temperature is a function of the fuel/air ratio and is directly related thereto as is the heat energy, which is another expression for engine thrust, it can be seen that limitations on operating temperature limit the admissible fuel and thereby thrust. Increased operating temperatures can be utilized if cooling means are provided for those engine components for which it is structurally feasible and if provided at certain strategic locations it will permit higher fuel/air ratios, thus yielding the desired thrust augmentation.

One such location which is structurally available for cooling and which would permit greater fuel/air ratios due to its location immediately adjacent the opening of the primary combustion means, is the turbine, that is, both the stators or rotors thereof. The provision of cooling means in the nozzle or guide vane blades comprising the stator would yield obvious advantageous opportunities and if the cooling means also constituted a means for admitting and vaporizing secondary fuel for burning in the afterburner, it would be doubly advantageous.

Therefore, it is an object of this invention to provide a means for introducing secondary fuel into a zone to the rear of the turbines of a turbo jet engine whereby the heat energy of the gases emanating from said turbine will be elevated and the thrust of the engine correspondingly increased with parts broken away and omitted.

It is another object of this invention to provide a secondary fuel admission system for turbo jet engines which system also functions to cool a critical part of the engine.

It is still another object of this invention to provide a secondary fuel admission system wherein a portion of said system functions to produce considerable turbulence in the secondary combustion zone insuring good mixing of the fuel and hot turbine exhaust gases.

A further object of this invention is to provide a secondary fuel admission system wherein the portion of the system introducing the fuel into the secondary combustion zone creates turbulence in said zone and consequently lower gas velocities thus eliminating the need for the conventional flameholder.

A still further object of this invention is to provide a secondary fuel admission wherein the element introducing the fuel into the secondary combustion zone is surrounded by a rich non-burning fuel-air mixture thus insuring a long life for the element.

Another object of this invention is to provide a system for introducing secondary fuel into the secondary combustion zone of a turbine jet which utilizes elements light in weight, modifying otherwise conventional engine elements whereby an overall reduction in engine weight is achieved.

Other objects and many of the attendant advantages of this invention will be readily appreciated as the same becomes better understood by reference to the following detailed description when considered in connection with the accompanying drawings wherein:

Figure 1 is longitudinal section of an engine embodying the invention with the forward part of the engine broken away.

Figure 2 is a view along the line 2—2 of Figure 1.
Figure 3 is a view along the line 3—3 of Figure 1.
Figure 4 is a view along the line 4—4 of Figure 1.

In Figure 1 the reference numeral 10 designates generally a turbo jet engine incorporating the invention. The portion of the engine forward of the primary combustion chambers is not shown and may be constituted by the conventional axial flow or centrifugal compressors in use. A shroud or outer casing 11, terminating in the conventional exhaust nozzle 40, surrounds the entire engine assembly and to it are attached the means for mounting the engine in the aircraft. The engine is provided with a longitudinally extending inner casing 12 which surrounds the inner rotating parts and seals them off from hot gases developed in the combustion process.

Passing through the inner casing 12 is the main shaft 13 which may be tubular as shown. Connected to the forward end of the shaft is the compressor and drive means for the engine auxiliaries (not shown). The rear end of the shaft 13 is mounted in a bearing 14 for rotation therein. Radially spaced from the inner casing 12 and adjacent to the outer casing 11 are the main or primary engine combustion chambers 15. These chambers are usually in the form of elongated hollow cylinders having air and fuel inlets and include ignition means (not shown). A disc shape shield 16 extends from the end of the combustion chambers 15 to the bearing 14 and functions to prevent passage of the hot products of combustion forward in the engine. The shield has an additional function in this invention to be described hereinafter.

Fuel admitted to the primary chambers 15 is burned with air compressed by the aforementioned compressor and delivered to turbine assembly. The turbine assembly is connected to main shaft 13 on a portion of the shaft which extends on the downstream side of the bearing 14. A bracket 17 mounted on the shaft by any suitable means or formed integrally therewith supports a plurality of spokes 18 which extend substantially outward. Each spoke may be formed as a scoop or have a scoop mounted thereon for a purpose to be described below. Mounted on the outer ends is a longitudinally extending flat annulus or support 19. The manner of forming this annulus is immaterial and it may be formed from a single member or made up from the bases of a plurality of turbine rotor discs. Extending radially outward from the annulus 19 are the turbine rotor discs 20 and 21. In the embodiment of the invention illustrated in the drawing the turbine is shown as having two stages but this is not critical and the turbine may have any number of stages from one up, the two stage turbine being shown by way of illustration only.

The disc 20 carries the turbine rotor blades 22 of the first stage while the disc 21 carries the rotor blades 23 of the second stage. Mounted by any suitable means on the casing 11 adjacent the openings 24 of the combustion chambers 15 are the nozzle blades or guide vanes 25 of the first turbine stage. Mounted by a similar means on the casing 11, intermediate the blades 22 and 23 are the nozzle blades or guide vanes 26 of the second stage.

A coupling 27 is connected to a fuel line supplying fuel from any suitable reservoir and is a part of a hollow ring manifold 28 extending around the outer casing 11. A plurality of ducts or tubes 28' extend from the manifold to the interior of the nozzle blades 25 which are formed as hollow members.

Mounted downstream of the turbine is the tail cone 31 formed as a hollow member and supported by struts 32 extending radially inward from the casing 11. The cone 31 has a plurality of holes or louvres 33 formed therein.

In the operation of the engine primary fuel is burnt in the combustors 15 driving the turbine rotors 20 and 21 which in turn drive the main shaft 13 through the spokes 18 and bracket 17. When it is desired to augment the engine output additional or secondary fuel is permitted by suitable control means to flow through a fuel line, coupling 27, ring manifold 28, tubes 28' and the hollow blades 25.

The fuel in its passage through the blades 25 passes over their hot interior surfaces and is vaporized thereby. The fuel flowing in these blades also functions to cool the blades so that a temperature higher than that ordinarily permitted in the region of the combustion chamber opening 24 is possible. Thus, higher than usual fuel/air ratios can be used for the primary combustion and the thrust of the engine and its overall efficiency increased.

Upon its exit through the bottom of the blades 25 the secondary fuel passes through a chamber 29 formed by the seal 16 and turbine disc 20. It is characteristic of this type of engine to have a pressure gradient wherein the region of the combustion chambers is higher than the afterburner zone 31. Thus, a potential exists whereby the secondary fuel is driven toward the afterburner as is desired. Under the influence of the driving potential the fuel passes through the spokes 18. The fan-like scoops of these spokes act as an additional propelling means for the fuel to aid this driving potential in moving the fuel through the spokes 18. There is a tendency for the axially directed combustion gases issuing from openings 24 of combustion chambers 15 to flow radially into spokes 18. However, the occupation of the area by the radially directed fuel being emitted from the stators 25 in quantities, which is controlled by adjustment of the valves 27, sufficient to maintain an over-rich mixture prevents a premature combustion in the nozzle 31.

The fuel after passing through the spokes 18 flows through the passage 30 formed by the annulus 19 and on into the vapor chamber 34 of the tail cone 31. It is then discharged through openings or louvres 33 where it may be ignited by any suitable means such as the spark plug 35.

The region of the exhaust nozzle 40 in the cone 31 where the fuel discharges from louvres 31 has a high turbulence level because the flow of the combustion gases moving from the turbines 20 and 21 separates from the sloping outer surface of the nozzle 31. That is the combustion gases move too fast to follow the slope of the nozzle 31. This is normally referred to as airflow separation. In the previous devices this turbulence is undesirable because this is the diffuser section for the afterburner. However, the system of this invention utilizes the high turbulence to mix the fuel vapor jets discharging from the tail cone and the hot gases leaving the turbine.

The turbulence thus created results in a low velocity eddy region which is the same result obtained with the installation of a flameholder. The tail cone then with no other flow passage obstruction gives a large flameholder area with no more loss than has the basic engine.

The introduction of the secondary fuel from the hollow tail cone also achieves other advantageous results. The burning in the afterburner zone is concentrated in a hot central core surrounding the tail cone and afterburner wall temperatures will be lower. The mixtures adjacent the tail cone outer skin are very rich and keep the flame front off the surface of the cone. Thus, the life of the cone is increased as is the overall life of the afterburner section.

Obviously, many modifications and variation of the present invention are possible in the light of the above teachings. It is therefore to be understood that within the scope of the appended claims the invention may be practiced otherwise than as specifically described.

What is claimed is:

1. A turbo jet propulsion unit comprising at least one primary combustion chamber and turbine means driven by hot gases emanating from said chamber, hollow guide vanes forming the first stage stator vanes of said turbine means, a main engine shaft, means supporting said main engine shaft in said unit, a plurality of spokes extending substantially radially from the end of said shaft, and adjacent the inner ends of said guide vanes, means on the other ends of said spokes for supporting the rotating elements of a turbine, fuel inlet means in an end of each of said guide vanes for introducing fuel adjacent said spokes, fuel vaporizing and dispersing means downstream of said rotating element supporting means.

2. A turbo jet propulsion unit as described in claim 1 wherein said fuel vaporizing and dispersing means comprises an apertured cone, and said unit includes struts supporting said cone.

3. In combination, an elongated engine housing, main combustor means disposed in said housing, a main engine shaft running a portion of the length of said housing and disposed with its axis at the center of said housing, bearing means supporting said main shaft, shielding means extending from said main combustor to said main shaft, a plurality of hollow turbine nozzles extending inwardly from said housing and disposed adjacent an end of said combustor means, fuel inlet means coupled to said hollow turbine nozzles through the wall of said housing, a plurality of spokes extending substantially radially from the end of said main shaft, a flat plate extending substantially parallel with the axis of said main shaft mounted on the ends of said spokes, a plurality of turbine discs extending radially from said plate, turbine blades mounted on the ends of each disc, a hollow tail cone open at its larger end, said tail cone extending over said discs and providing a passage continuing a passage formed by hollow nozzles, said shield and said plate, said hollow tail cone having a plurality of apertures formed therein, and strut means extending from the wall of said tail cone.

References Cited in the file of this patent

UNITED STATES PATENTS 2,479,777     Price _____ Aug. 23, 1949
2,647,684     Lombard _____ Aug. 4, 1953